United States Patent
Uehara et al.

[11] Patent Number: 6,113,131
[45] Date of Patent: Sep. 5, 2000

[54] INSTRUMENT PANEL

[75] Inventors: Kazuhito Uehara; Kazuhiro Saito, both of Omiya, Japan

[73] Assignee: Kansei Corporation, Omiya, Japan

[21] Appl. No.: 09/069,077

[22] Filed: Apr. 29, 1998

[30] Foreign Application Priority Data

| May 2, 1997 | [JP] | Japan | 9-114859 |
| May 26, 1997 | [JP] | Japan | 9-135422 |
| Oct. 8, 1997 | [JP] | Japan | 9-275605 |

[51] Int. Cl.[7] ............................................. B60R 21/20
[52] U.S. Cl. ................................................. 280/728.3
[58] Field of Search ............................. 280/728.3, 732, 280/731

[56] References Cited

U.S. PATENT DOCUMENTS

| 5,447,328 | 9/1995 | Iannazzi et al. | 280/728.3 |
| 5,524,923 | 6/1996 | Henseler | 280/728.3 |
| 5,779,262 | 7/1998 | Totani et al. | 280/728.3 |
| 5,863,064 | 1/1999 | Rheinlander et al. | 280/732 |
| 5,961,142 | 10/1999 | Shirake et al. | 280/728.3 |
| 5,961,143 | 10/1999 | Hlywka et al. | 280/728.3 |

FOREIGN PATENT DOCUMENTS 0 711 627  5/1996  European Pat. Off. .

*Primary Examiner*—Brian L. Johnson
*Assistant Examiner*—Tony Winner
*Attorney, Agent, or Firm*—Foley & Lardner

[57] ABSTRACT

In an instrument panel 21 of the invention, a foamed layer 23 and a skin 24 are laminated in this sequence on the surface of a resin-made core member 22 which is disposed in front of a main unit of an air bag apparatus, and a tearable portion 26 for inflating an air bag is formed by irradiation of a laser beam from the back face of the resin-made core member 22. The tearable portion 26 elongates from the core member 22 to a part of a back face side of the skin 24.

16 Claims, 13 Drawing Sheets

INSTRUMENT PANEL

BACKGROUND OF THE INVENTION

1. Field of the Invention

The invention relates to an instrument panel in which a tearable portion for inflating an air bag that cannot be seen from the outside is formed from the side of a core member disposed in front of a main unit of an air bag apparatus.

2. Description of the Related Art

An example of an instrument panel of the prior art is shown in FIG. 14 (see Japanese patent publication (Kokai) No. HEI6-25059).

As shown in FIG. 14, the prior art example is configured so that a foamed layer 13 and a skin 14 are laminated in this sequence on a core member 12, an opening portion 12a for inflating an air bag is formed in the core member 12, and an air bag lid member 15 is incorporated so as to close the opening portion 12a. In the foamed layer 13, a notch 5 is formed along the peripheral edge of the opening portion 12a. The notch 5 is formed in the following manner. As shown in FIG. 14C, a molding process is conducted by using a molding die (not shown) in which a projection mold member 16 is incorporated in a core of the molding die, thereby forming the notch 5 along the peripheral edge of the opening portion 12a. In this way, an instrument panel 10 having the notch 5 that cannot be seen from the outside is formed.

When an air bag (not shown) operates and the inflation pressure acts on the air bag lid member 15, therefore, the notch 5 is torn to enable the air bag to inflate.

In the prior art example, the shape of the notch 5 that cannot be seen from the outside is formed by previously setting the shape of the notch 5 in the molding die. When the inflation state of the air bag is not appropriate, therefore, it is necessary to disassemble the molding die and then correct the shape of the projection mold member 16. Consequently, the prior art example has a problem in that the correction requires a prolonged time period and many manhours, thereby increasing the production cost.

SUMMARY OF THE INVENTION

The present invention has been made to solve the above problem with the conventional panel and therefore an object of the invention is to provide an instrument panel in which an appropriate tearable portion for inflating an air bag can be economically formed without requiring a molding die for forming the tearable portion.

In order to attain the object, according to a first aspect of the invention, a foamed layer and a skin are laminated in this sequence on a surface of a resin-made core member which is disposed in front of a main unit of an air bag apparatus, and a tearable portion for inflating an air bag is formed by irradiation of a laser beam from a back face of the resin-made core member, the tearable portion elongating from the core member to a part of a back face side of the skin.

According to a second aspect of the invention, an opening portion for inflating an air bag is formed in a resin-made core member which is disposed in front of a main unit of an air bag apparatus, a lid of a thermoplastic elastomer which closes the opening portion for inflating an air bag is formed integrally with the core member, a foamed layer and a skin are laminated in this sequence to elongate from a surface of the core member to a surface of the lid, and a tearable portion for inflating an air bag is formed by irradiation of a laser beam from a back face of the lid, the tearable portion elongating from the lid to a part of a back face side of the skin.

According to a third aspect of the invention, an opening portion for inflating an air bag is formed in a resin-made core member which is disposed in front of a main unit of an air bag apparatus, a lid of a thermoplastic elastomer which closes the opening portion for inflating an air bag is fixed to the core member through a bracket, a foamed layer and a skin are laminated in this sequence to elongate from a surface of the core member to a surface of the lid, and a tearable portion for inflating an air bag is formed by irradiation of a laser beam from a back face of the lid, the tearable portion elongating from the lid to a part of a back face side of the skin.

According to a fourth aspect of the invention, the instrument panel of the third aspect is configured so that a groove is formed to thin a predetermined position of the lid which is to be irradiated with a laser beam.

According to a fifth aspect of the invention, the instrument panel of the third aspect is configured so that a slit having a suitable width is formed at a predetermined position of the tearable portion of the lid which is to be irradiated with a laser beam.

According to a sixth aspect of the invention, an opening portion for inflating an air bag is formed in a resin-made core member which is disposed in front of a main unit of an air bag apparatus, a lid of a thermoplastic elastomer is fixed to the core member through a bracket, the lid closing the opening portion for inflating an air bag in a state where a gap of a predetermined size is formed between the lid and the an opening edge of the opening portion for inflating an air bag, a foamed layer and a skin are laminated in this sequence to elongate from a surface of the core member to a surface of the lid, a recess or a through hole is continuously or intermittently formed by irradiation of a laser beam along the gap of the bracket, and a tearable portion for inflating an air bag is formed by irradiation of a laser beam from a back face of the lid, the tearable portion elongating from the foamed layer to a part of a back face side of the skin.

According to a seventh aspect of the invention, the instrument panel of the sixth aspect is configured so that, in the bracket through which the lid is fixed to the core member, the lid closing in a state where the gap of predetermined size is formed between the lid and the opening edge of the opening portion for inflating an air bag, both end portions of the bracket are formed integrally with the core member and the lid so as to be coupled therewith, respectively.

According to an eighth aspect of the invention, an opening portion for inflating an air bag is formed in a resin-made core member which is disposed in a whole face of a main unit of an air bag apparatus, a metal lid which closes the opening portion for inflating an air bag is fixed to the core member through a mounting portion which is integrally formed, a foamed layer and a skin are laminated in this sequence to elongate from a surface of the core member to a surface of the metal lid, a continuous slit is formed in the metal lid, and a tearable portion for inflating an air bag is formed by irradiation of a laser beam from a back face of the metal lid and along the slit, the tearable portion elongating from the foamed layer to a part of a back face side of the skin.

According to a ninth aspect of the invention, the instrument panel of the first to eighth aspect is configured so that the tearable portion for inflating an air bag which portion is cut by the irradiation of a laser beam is continuously or intermittently formed.

According to a tenth and an eleventh aspects, the instrument panel of the ninth aspect is configured so that the tearable portion for inflating an air bag which portion is cut by the irradiation of a laser beam has a cut width or a cut diameter of about 0.1 to about 1.0 mm, and an intermittence pitch of about 0.1 to about 3.5 mm.

According to a twelfth aspect of the invention, a foamed layer and a skin are laminated in this sequence on a surface of a resin-made core member which is disposed in front of a main unit of an air bag apparatus, a surface of a lid of a thermoplastic elastomer which closes an opening portion for inflating an air bag, the opening portion being formed in the resin-made core member, or a surface of a metal lid which closes the opening portion for inflating an air bag, the opening portion being formed in the resin-made core member, a recess which is directed toward the skin is formed in the resin-made core member, the thermoplastic elastomer-made lid, or the metal lid, and a tearable portion for inflating an air bag is formed by irradiation of a laser beam to the recess from a back face of the resin-made core member, the thermoplastic elastomer-made lid, or the metal lid, the tearable portion being cut so as to elongate from the resin-made core member, the thermoplastic elastomer-made lid, or the metal lid to a part of a back face side of the skin.

According to a thirteenth aspect of the invention, the instrument panel of the first to eight aspects and the twelfth aspect is configured so that the tearable portion for inflating an air bag which portion is cut by the irradiation of a laser beam has an H-like shape, and is continuously or intermittently formed.

According to a fourteenth aspect of the invention, the instrument panel of the thirteenth aspect is configured so that the tearable portion for inflating an air bag which portion is cut by the irradiation of a laser beam is formed into an H-like shape, a middle part of a lateral tearable portion and intersection parts of the lateral tearable portion and vertical tearable portions are continuously formed, and another part is intermittently formed.

According to a fifteenth aspect of the invention, the instrument panel of the fourteenth aspect is configured so that the middle part of the lateral tearable portion of the tearable portion for inflating an air bag which portion is continuously cut-shaped by the irradiation of a laser beam has a continuous length of about 20 mm, a part of the lateral tearable portion elongating to the vertical tearable portions has a continuous length of about 10 mm, and the vertical tearable portions have a continuous length of about 20 mm.

According to a sixteenth and a seventeenth aspects, the instrument panel of the fifteenth aspect is configured so that the tearable portion for inflating an air bag which portion is continuously cut-shaped by the irradiation of a laser beam has a continuous width or a cut diameter of about 0.1 to about 1.0 mm, and an intermittence pitch of about 0.1 to about 3.5 mm.

According to an eighteenth aspect of the invention, the instrument panel of the tenth to seventeenth aspects is configured so that, in the tearable portion for inflating an air bag which portion is cut by the irradiation of a laser beam, a surface side of the skin remains to exist in a range of about 0.3 to 0.7 mm.

According to a ninteenth aspect of the invention, the instrument panel of the first to eighteenth aspects is configured so that the foamed layer is made of a thermoplastic resin material, and a film is formed by heating fusion on a cut surface which is formed when the tearable portion for inflating an air bag is continuously or intermittently cut by the irradiation of a laser beam.

The thermoplastic elastomer may be a thermoplastic elastomer of styrene, olefin, or the like which is particularly excellent in shock resistance in a low temperature region, and which can be formed into a lid or the like by injection molding or the like.

DETAILED DESCRIPTION OF THE PREFERRED EMBODIMENTS

Figure 1:
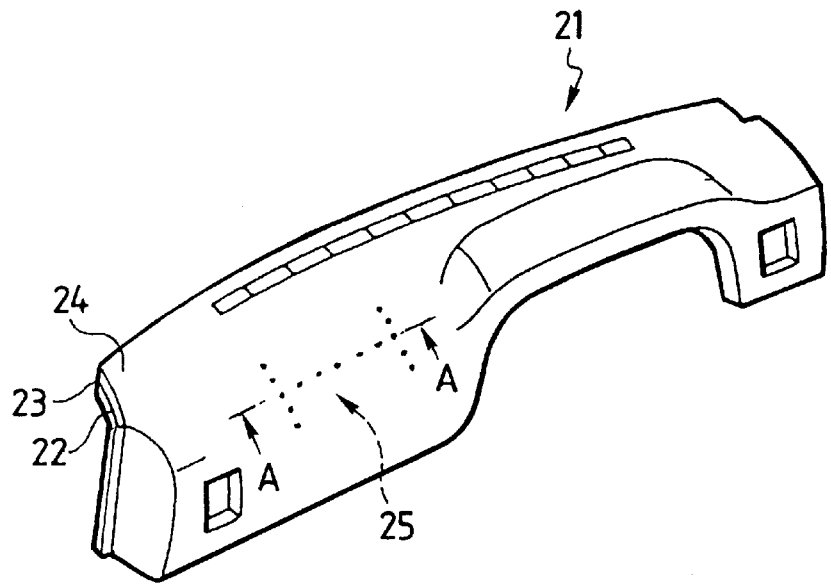
FIG. 1A is a perspective view of an instrument panel of Embodiment 1 of the invention.
FIG. 1B is a section view taken along the line A—A of FIG. 1A.
FIG. 1C is a section view taken along the line A—A and showing the state of forming a film in a tearable portion.
Figure 1:
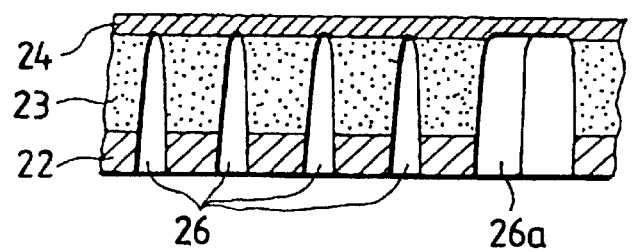
Figure 1:
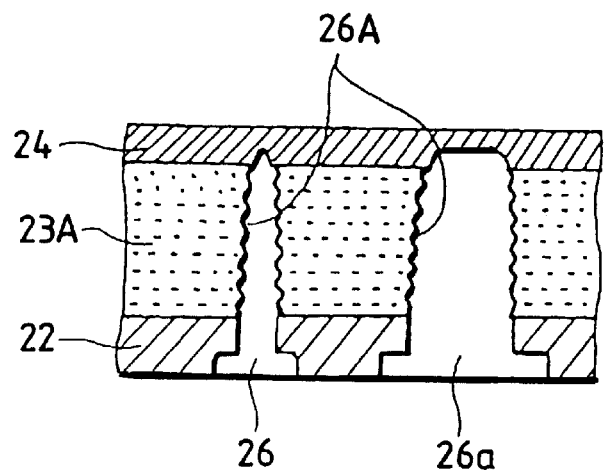
Figure 2:
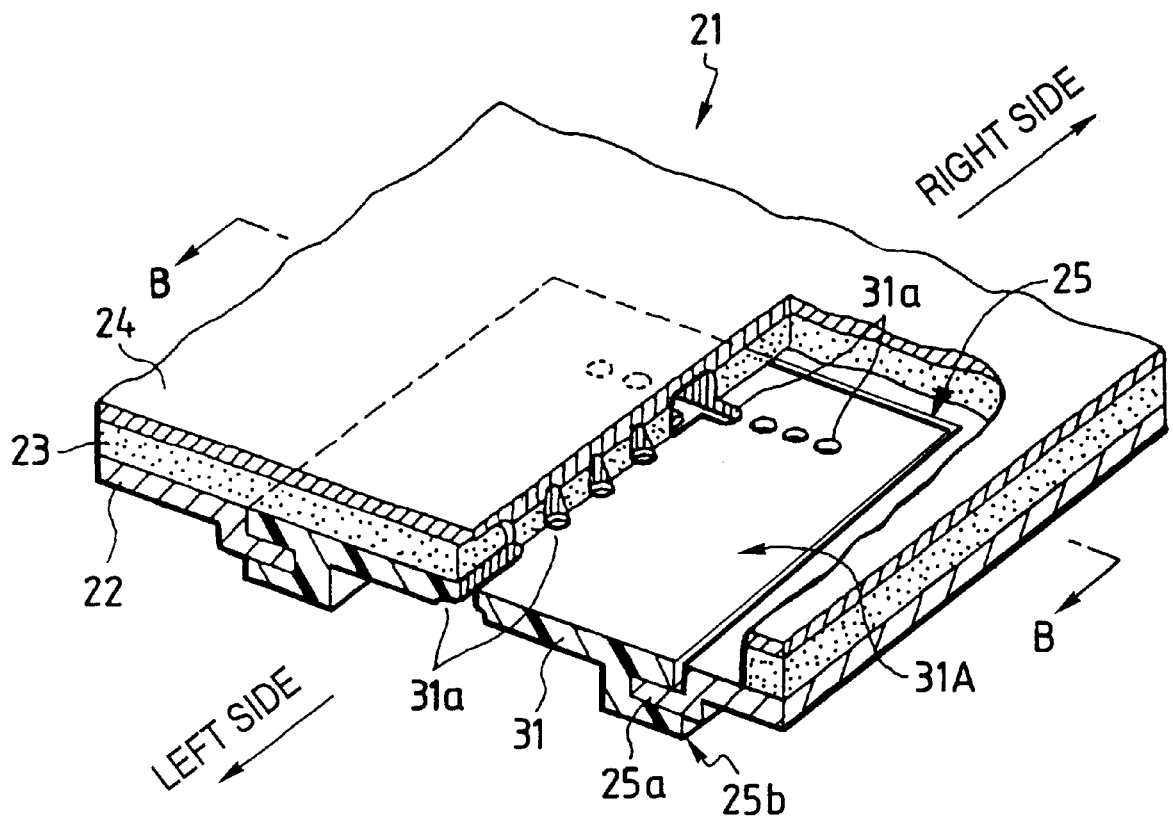
FIG. 2A is a partial perspective view showing the configuration of a lid in Embodiment 2 of the invention.
FIG. 2B is a section view taken along the line B—B of FIG. 2A.
Figure 2:
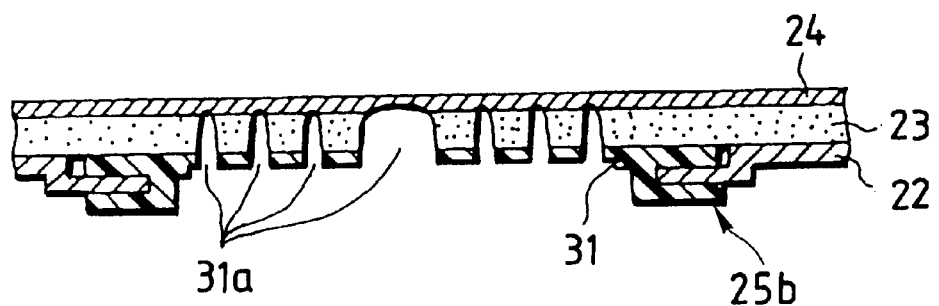
Figure 3:
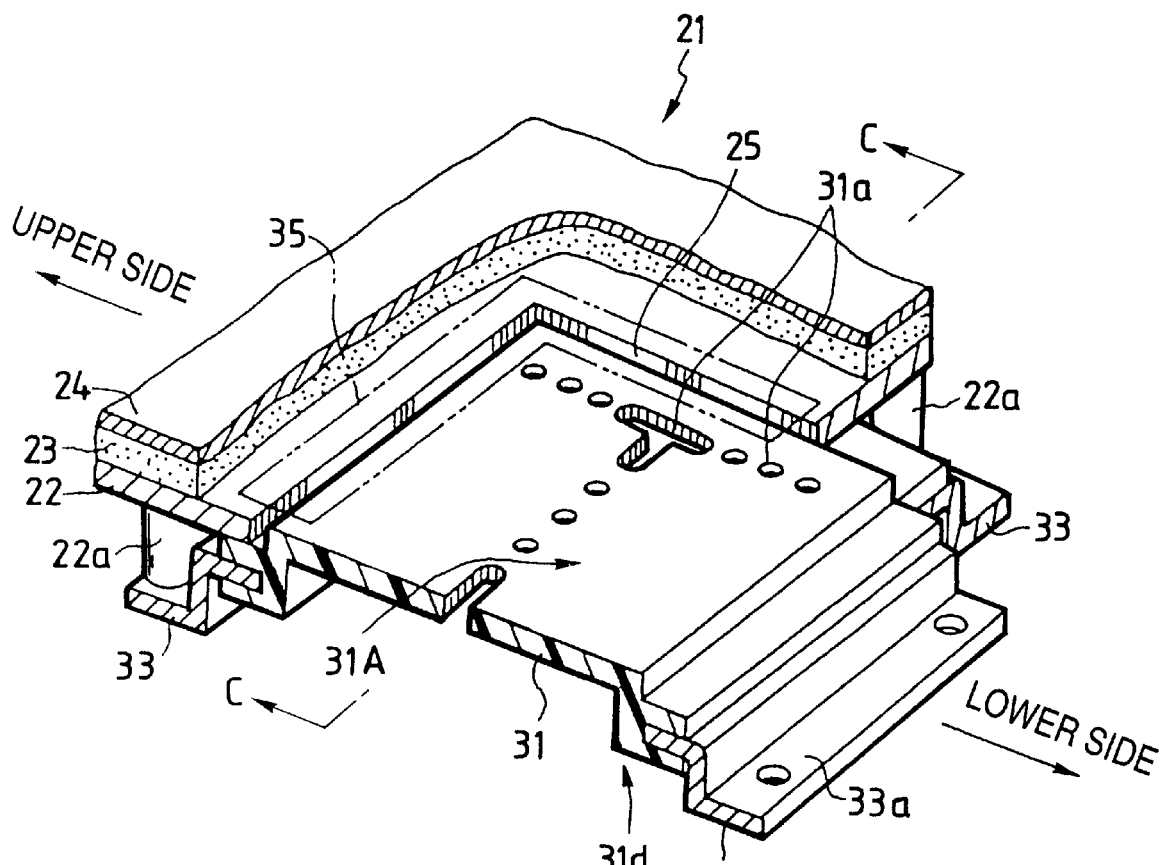
FIG. 3A is a partial perspective view showing the configuration of a lid in Embodiment 3 of the invention.
FIG. 3B is a section view taken along the line C—C of FIG. 3A.
Figure 3:
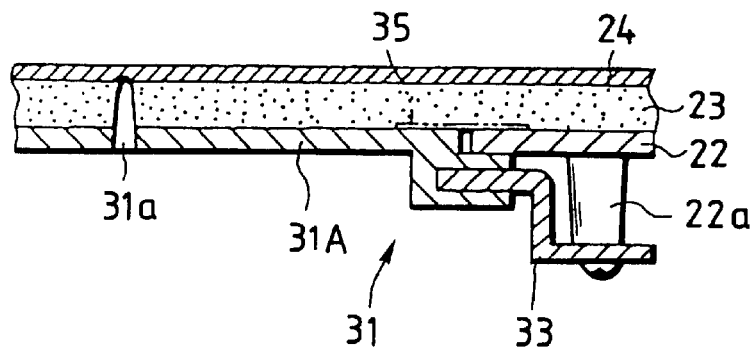
Figure 4:
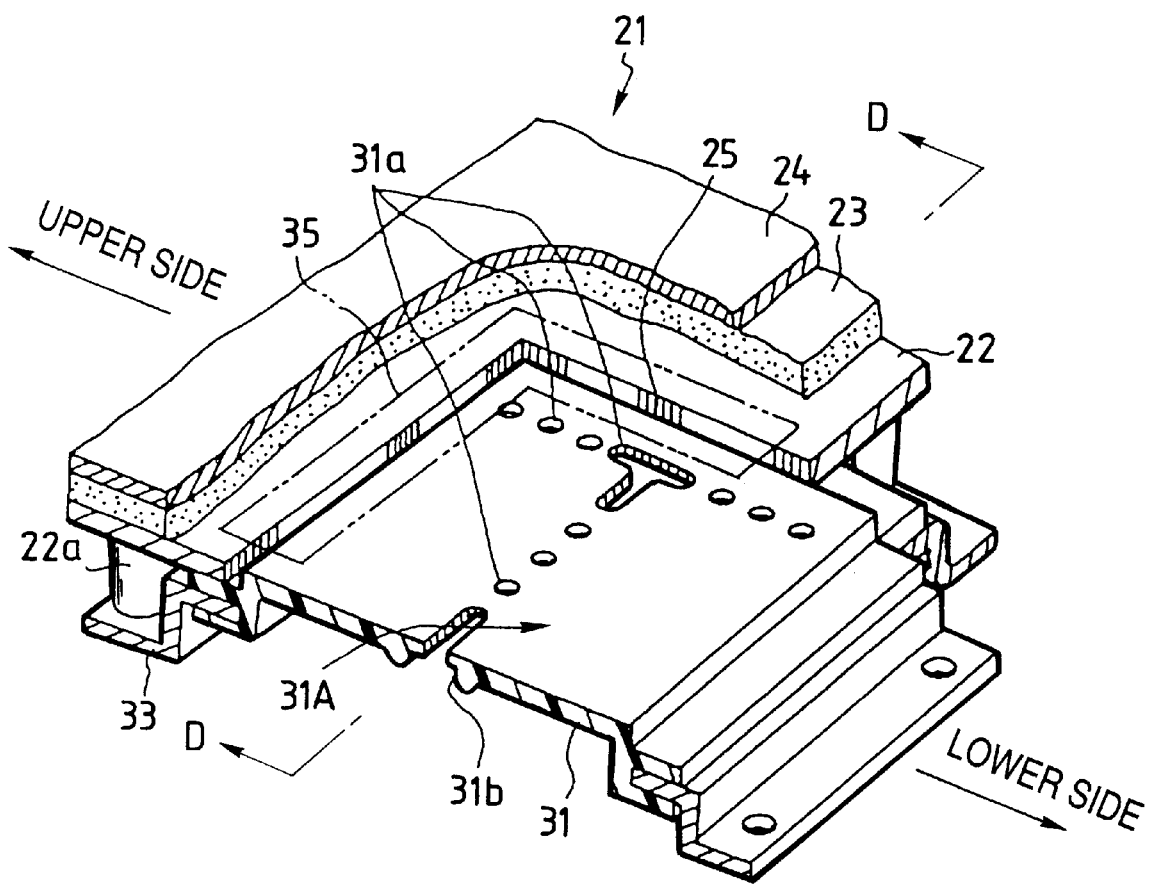
FIG. 4A shows Modification 1 of FIGS. 3A and 3B.
FIG. 4B is a section view taken along the line D—D of FIG. 4A.
Figure 4:
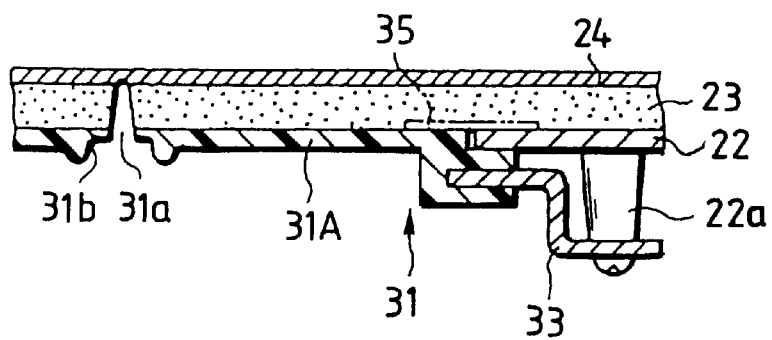
Figure 5:
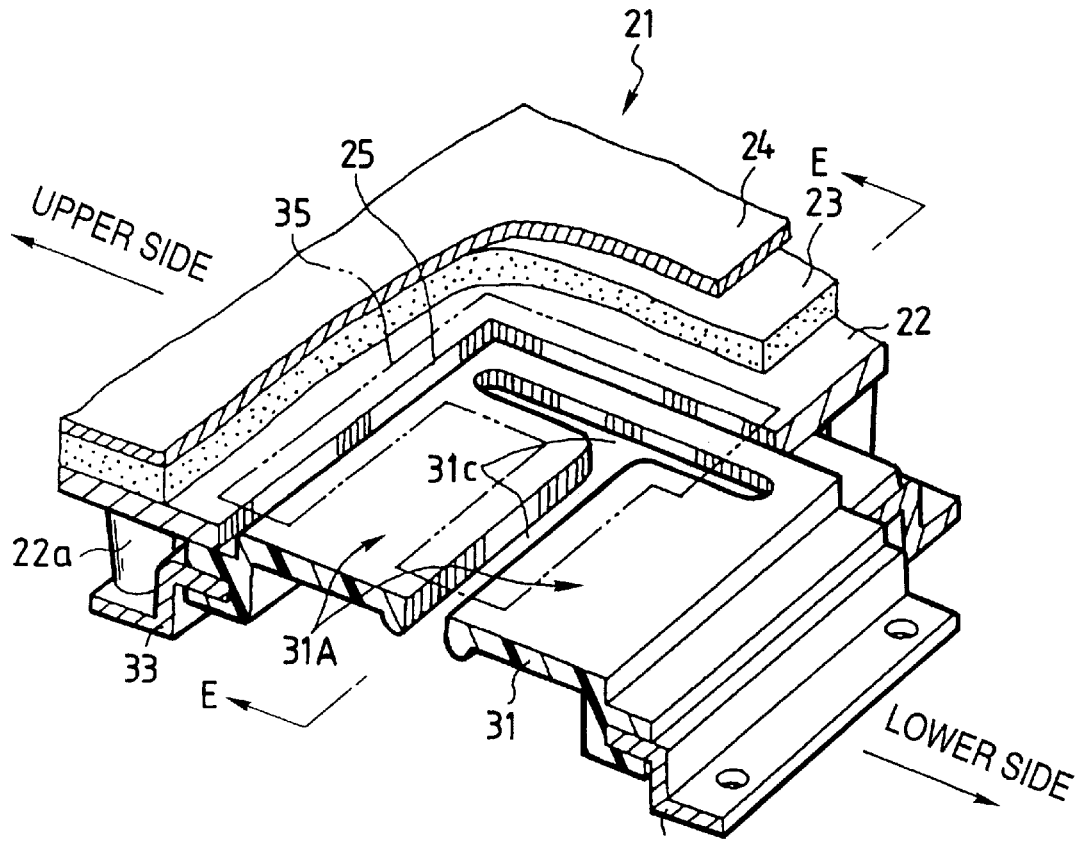
FIG. 5A shows Modification 2 of FIG. 3A.
FIG. 5B is a section view taken along the line E—E of FIG. 5A.
Figure 5:
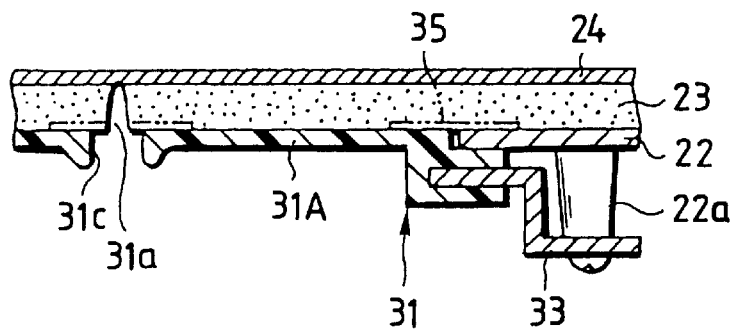
Figure 6:
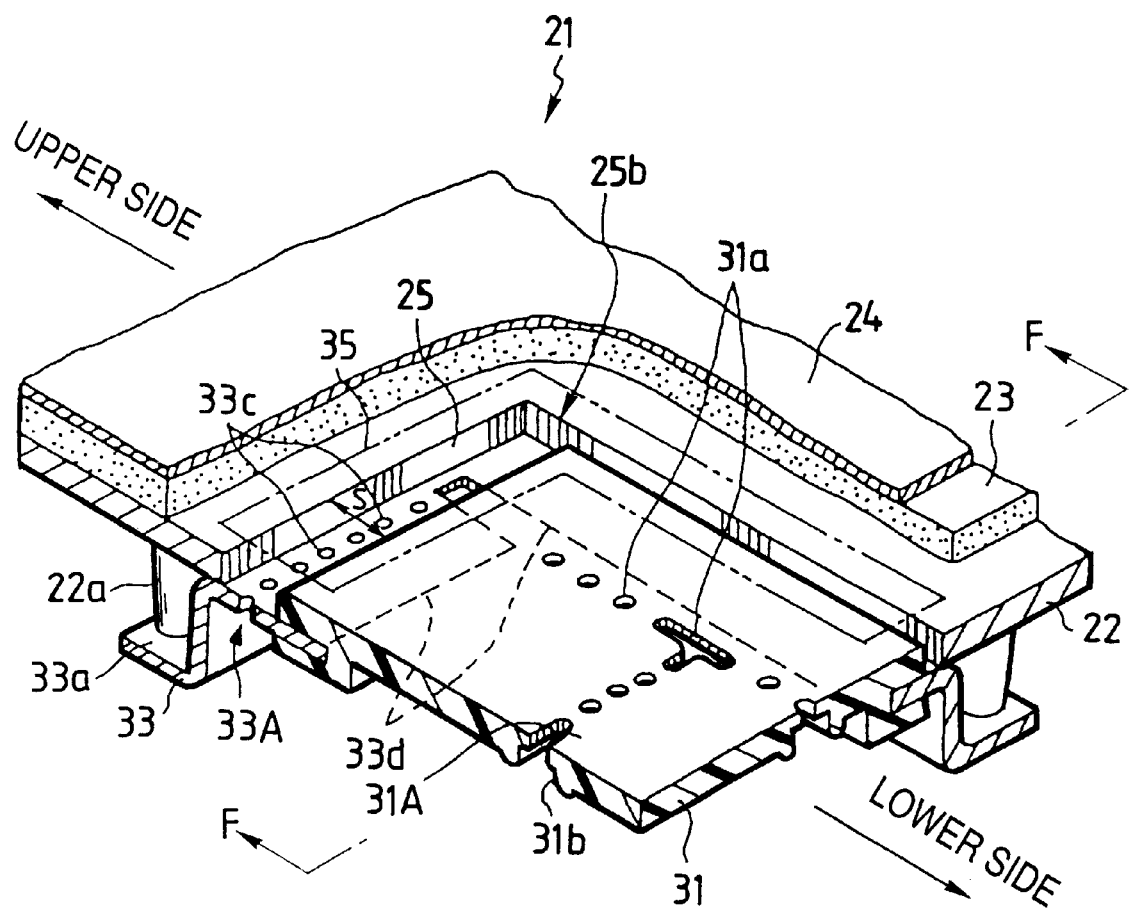
FIG. 6A is a partial perspective view showing the configuration of a lid in Embodiment 4 of the invention.
FIG. 6B is a section view taken along the line F—F of FIG. 6A.
Figure 6:
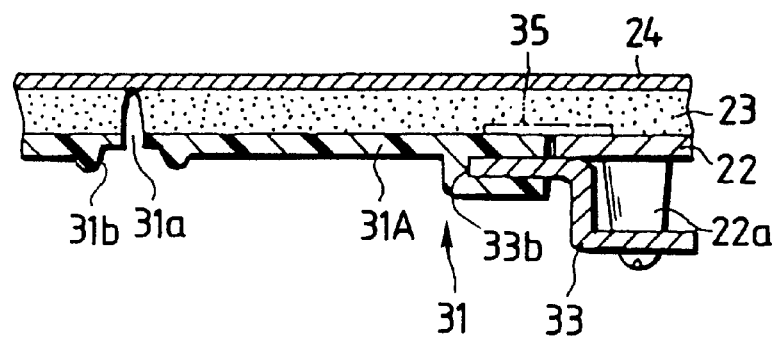
Figure 7:
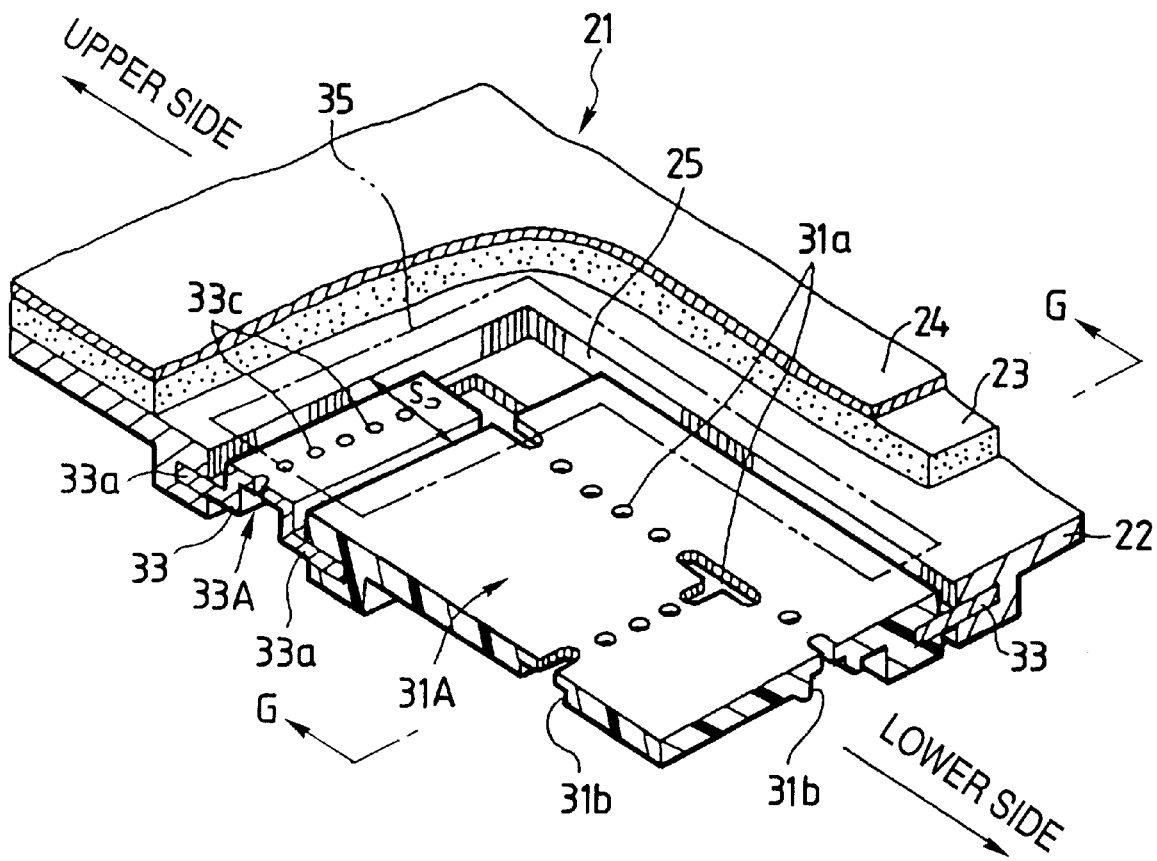
FIG. 7A shows a modification of FIGS. 6A and 6B.
FIG. 7B is a section view taken along the line G—G of FIG. 7A.
Figure 7:
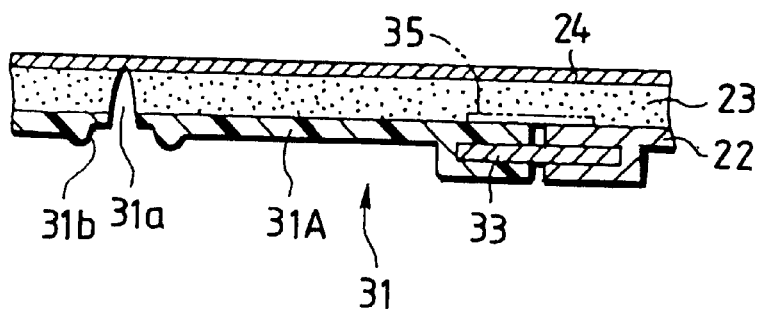
Figure 8:
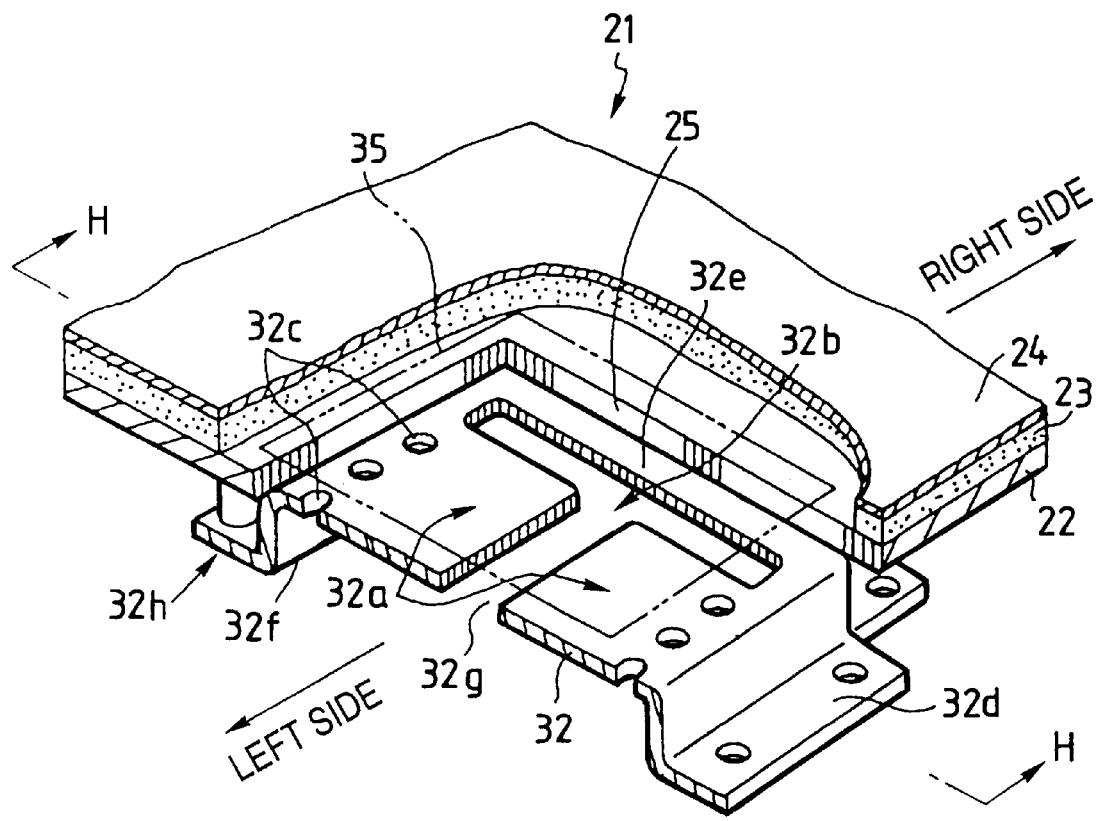
FIG. 8A is a partial perspective view showing the configuration of a lid in Embodiment 5 of the invention.
FIG. 8B is a section view taken along the line H—H of FIG. 8A.
Figure 8:
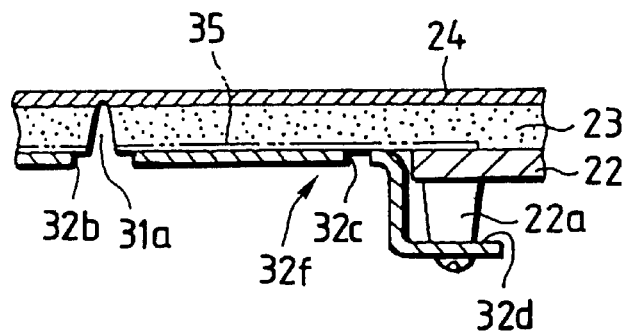

Hereinafter, embodiments of the instrument panel of the invention will be described with reference to FIGS. 1 to 13.

(Embodiment 1)

FIGS. 1A, 1B, and 1C show Embodiment 1 of the instrument panel, FIG. 1A is a perspective view of the instrument panel, FIG. 1B is a section view taken along the line A—A of FIG. 1A, and FIG. 1C is a section view taken along the line A—A of FIG. 1A and showing the state of a tearable portion.

Referring to FIG. 1A, 21 designates the instrument panel, 22 designates a core member, 23 designates a foamed layer, and 24 designates a skin. The foamed layer 23 is formed by injecting a foaming agent between the core member 22 formed by injection molding of a resin or the like and the skin 24 formed by vacuum forming or the like, so that the three layers are integrally bonded together, thereby forming the instrument panel 21.

Referring to FIG. 1B, 26 designates the tearable portion which is formed from the side of the core member. The tearable portion 26 is formed by intermittent recesses so as to elongate over the core member 22, the foamed layer 23, and the skin 24.

In FIG. 1C, a so-called laminate sheet is formed in which the foamed layer 23 is configured as a foamed layer 23A made of a thermoplastic resin material and the foamed layer 23A is bonded with the skin 24 by welding or the like. The sheet is formed integrally with the core member 22. The other configuration is the same as that of FIG. 1B.

For example, the foamed layer made of a thermoplastic resin material may be formed by foaming an olefin material or a styrene resin at an expansion ratio of 5 to 30, and then laminated with the skin.

In the above configuration, the tearable portion 26 is formed by irradiation of a laser beam. Specifically, as shown in FIGS. 1A, 1B, and 1C, the tearable portion 26 having a spearhead-like section shape is intermittently engraved so as to form an H-like shape and elongate from the back face of the core member 22 to the foamed layer 23 and the skin 24, thereby forming an opening portion 25 for inflating an air bag.

As shown in FIG. 1C, the foamed layer 23 which is configured as the foamed layer 23A made of a thermoplastic resin material may be thermally fused by irradiation heat of a laser beam, and the section surface may be then hardened so as to form a film 26A.

In the intersection parts of the H-like shape of the tearable portion 26, as shown in FIG. 1B, a continuous part 26a which is continuously engraved may be formed.

The tearable portion 26 for forming the opening portion 25 may be formed into a U-like shape in accordance with the design shape of the instrument panel 21, the direction of inflation, etc.

In a three-layer instrument panel 21 of the prior art in which an opening portion is not formed, the back face of the core member 22 may be irradiated with a laser beam so that the tearable portion 26 is additionally formed, whereby the opening portion 25 for inflating an air bag may be formed.

(Embodiment 2)

FIGS. 2A and 2B show Embodiment 2 of the instrument panel, FIG. 2A is a partial perspective view of the instrument panel in which a foamed layer and a skin are laminated on the surface of a member formed by integrating a core member with a lid, and FIG. 2B is a section view taken along the line B—B of FIG. 2A.

The components identical or equivalent to those of Embodiment 1 are designated by the same reference numerals, and their description is omitted.

Referring to FIG. 2A, in the instrument panel 21, a substantially rectangular opening portion 25 is disposed in the core member 22 formed by injection molding or the like. A flange 25a is formed along an opening edge 25b of the opening portion 25.

A lid 31 made of a thermoplastic elastomer which is formed by injection molding or the like is disposed so as to close the opening portion 25. The lid clamps the flange 25a of the core member 22 and is fusingly engaged with the flange, thereby forming the integrated core member 22. The foamed layer 23 is formed by injecting a foaming agent between the core member 22 and the skin 24. These three layers constitute the instrument panel 21 in which the three layers are integrated with one another.

In the above configuration, a tearable portion 31a is formed by irradiation of a laser beam from the back face of the lid 31 so that, as shown in FIG. 2A, the tearable portion 31a is continuously or intermittently formed so as to elongate over the lid 31, the foamed layer 23, and the skin 24.

As shown in FIG. 2B, the intersection and middle parts of the H-like shape of the tearable portion 31a are formed by continuous engraving, and the other part of the tearable portion 31a is formed so as to have a spearhead-like section shape by intermittent engraving.

When an air bag operates and the inflation pressure acts on the lid 31, therefore, the lid is torn in an H-like shape along the tearable portion 31a which is formed into an H-like shape, and a lid portion 31A is opened in the vertical directions of a vehicle, with the result that the air bag is inflated into the compartment.

In the embodiment, the tearable portion 31a is formed into an H-like shape. Alternatively, the tearable portion may be formed into a U-like shape or another shape in accordance with the design shape of the instrument panel 21, restrictions on the direction of inflation, etc.

(Embodiment 3)

FIGS. 3A and 3B show Embodiment 3 of the instrument panel, FIG. 3A is a partial perspective view showing the configuration of a lid, and FIG. 3B is a section view taken along the line C—C of FIG. 3A.

FIGS. 4A and 4B, and FIGS. 5A and 5B show Modifications 1 and 2 of FIGS. 3A and 3B, respectively.

The components identical or equivalent to those of Embodiment 2 are designated by the same reference numerals, and their description is omitted.

Referring to FIG. 3A, in the instrument panel 21, the substantially rectangular opening portion 25 is disposed in the core member 22 formed by injection molding or the like. The lid 31 is fixed to bosses 22a of the core member 22 so as to close the opening portion 25.

The lid 31 is combined with the core member 22. The foamed layer 23 is formed by injecting a foaming agent between the face in which a gap between the core member 22 and the lid 31 is closed by a sealing tape 35, and the skin 24. These three layers constitute the instrument panel 21 in which the three layers are integrated with one another.

The lid 31 is configured by the lid portion 31A made of a thermoplastic elastomer, and a metal bracket 33.

The lid portion 31A has a flat face which closes the opening portion 25, and a peripheral portion 31d which is set back from the flat face so as to be positioned on the back face of the core member 22. The upper face portion of the bracket 33 which is formed into a step-like section shape is inserted into the peripheral portion 31d of the lid portion 31A to be fixed thereto. A flange face 33a of the lower face portion is fixed to the bosses 22a disposed on the core member 22. Therefore, the lid portion is integrated with the core member.

The thus configured instrument panel 21 is irradiated with a laser beam in a predetermined direction from the back face of the lid 31, so that the tearable portion 31*a* (see FIG. 3A) elongating over the lid portion 31A, the foamed layer 23, and the skin 24 is formed into a predetermined shape (in the embodiment, an H-like shape).

When the lid 31 receives the inflation pressure of the air bag, the lid is opened at the tearable portion 31*a*.

The other configuration and function are the same as those of Embodiment 2, and hence their description is omitted.
(Modification 1)

In Modification 1, as shown in FIGS. 4A and 4B, a groove 31*b* is formed in the lid portion 31A previously or during the process of shaping the lid 31 so as to form a groove bottom of a reduced thickness, and the tearable portion 31*a* for inflating an air bag is then formed.

When irradiation of a laser beam is conducted in the thus formed groove 31*b* so as to form the tearable portion 31*a* elongating over the lid portion 31A, the foamed layer 23, and the skin 24, therefore, the laser irradiation power can be reduced by a degree corresponding to the reduction of the thickness of the bottom face of the groove 31*b* with respect to the thickness of the lid portion 31A shown in FIGS. 4A and 4B.

The other configuration and function are the same as those shown in FIG. 3A, and hence their description is omitted.
(Modification 2)

In Modification 2, as shown in FIGS. 5A and 5B, a slit 31*c* is formed in the lid portion 31A previously or during the process of shaping the lid 31, and the tearable portion 31*a* for inflating an air bag is then formed.

When irradiation of a laser beam is conducted in the slit 31*c* so as to form the tearable portion 31*a* elongating over the lid portion 31A, the foamed layer 23, and the skin 24, therefore, the laser irradiation power can be further reduced by a degree corresponding to the elimination of formation of the tearable portion 31*a* in the lid portion 31A.

The other configuration and function are the same as those shown in FIG. 3A, and hence their description is omitted.
(Embodiment 4)

FIGS. 6A and 6B show Embodiment 4 of the instrument panel, FIG. 6A is a partial view showing the configuration of a lid, and FIG. 6B is a section view taken along the line F—F of FIG. 6A. FIGS. 7A and 7B show a modification of FIGS. 6A and 6B.

The components identical or equivalent to those of Embodiment 3 are designated by the same reference numerals, and their description is omitted.

Referring to FIG. 6A, in the instrument panel 21, the substantially rectangular opening portion 25 is disposed in the core member 22 formed by injection molding or the like. The lid 31 is disposed so as to close the opening portion 25. The foamed layer 23 is formed by injecting a foaming agent between the face in which a gap between the core member 22 and the lid 31 is closed by the sealing tape 35, and the skin 24 overlapping with the face. These three layers constitute the instrument panel 21 in which the three layers are integrated with one another.

The lid 31 is configured by the lid portion 31A made of a thermoplastic elastomer, and the bracket 33.

The bracket 33 is provided with the flange face 33*a* at the peripheral edge, and has a step-like section shape. The flange face 33*a* is fixed to the back face of the core member 22 through bosses 22*a*. A horizontal face which elongates in a direction perpendicular to a vertical face raised from the flange face 33*a* is separated from the opening edge 25*b* of the opening portion 25 by a predetermined gap (S). During a period when the lid portion 31A is inserted, the bracket 33 is exposed.

A tip end portion 33*d* which is formed by further elongating the exposed face is inserted into the lid portion 31A and an appropriate length of the tip end portion is clampingly bonded to the lid portion to be integrated with the lid portion, thereby forming the lid 31.

In the tip end portion 33*d* of the bracket 33 which is inserted, a notch 33*b* having a substantially H-like shape is formed. Therefore, the tearable portion 31*a* is prevented from interfering with the inserted bracket 33.

In the thus configured instrument panel 21, the face of the bracket 33 in the gap (S) is irradiated with a laser beam in lateral directions, so that hinge holes 33*c* of an appropriate diameter are intermittently formed, thereby configuring a hinge portion 33A.

The tearable portion 31*a* elongating over the foamed layer 23 and the skin 24 is formed by irradiation of a laser beam along the groove 31*b* and from the back face of the lid portion 31A.

When the lid 31 receives the inflation pressure of the air bag, the lid is torn at the tearable portion 31*a*, and then opened with using the hinge portion 33A having the hinge holes 33*c* formed in the bracket 33, with the result that the air bag is inflated into the compartment.

The other configuration and function are the same as those of Embodiment 3, and hence their description is omitted.
(Modification)

The modification of FIGS. 7A and 7B is configured in the same manner as FIG. 6A except the shape of the bracket 33.

The upper-side and lower-side hinge portions 33A of the bracket 33 are formed so as to have a hat-like section shape. The flange faces 33*a* of both the sides of the hat-like section are inserted into the core member 22 and the lid portion 31A to be clamped thereby. A middle part separated by the predetermined gap (S) from the opening edge 25*b* is substantially linearly irradiated with a laser beam, so that the hinge holes 33*c* are intermittently formed, thereby configuring the hinge portion 33A.

The lid 31 is shaped by inserting the bracket 33 into a molding die during a process of molding the core member 22.

The other configuration and function are the same as those shown in FIGS. 6A and 6B, and hence their description is omitted.
(Embodiment 5)

FIGS. 8A and 8B show Embodiment 5 of the instrument panel, FIG. 8A is a partial perspective view showing the configuration of a lid, and FIG. 8B is a section view taken along the line H—H of FIG. 8A.

The components identical or equivalent to those of Embodiment 4 are designated by the same reference numerals, and their description is omitted.

Referring to FIGS. 8A and 8B, the opening portion 25 is disposed in the core member 22 formed by resin injection molding or the like. A metal lid 32 is fixed to the core member so as to close the opening portion 25.

The faces of the lid 32 and the core member 22 are covered by the sealing tape 35 which closes the gap formed between the two members. Thereafter, a foaming agent is injected between the faces and the skin 24 to form the foamed layer 23. These three layers constitute the instrument panel 21 in which the three layers are integrated with one another.

The metal lid 32 has the flange face 33*a* in a substantially whole area of the peripheral edge, and is formed into a box-like shape which opens toward the side of the flange face 32*d*. The flange face 33*a* is fixed to the core member 22 through the bosses 22*a* on the rear face of the core member 22.

A notched groove 32b of an H-like shape is disposed in the bottom face 32e of the box-like lid 32. A lid portion 32a is formed in an area surrounded by the both side parts of the H-like notched groove 32b and intermittent small holes 32c which are opened so as to connecting the side parts of the notched groove 32b.

The thus configured instrument panel 21 is irradiated with a laser beam along the interior of the notched groove 32b disposed in the metal lid 32, so that the tearable portion 31a is formed to elongate over the foamed layer 23 and the skin 24.

In Embodiment 5, a hinge portion 32f is formed by the small holes 32c. The small holes 32c may be formed by irradiation of a laser beam.

When an air bag operates and the metal lid portion 32a receives the inflation pressure, the metal lid portion 32a is torn at the tearable portion 31a, and then opened with using the succeeding hinge portion 32f, with the result that the air bag is inflated into the compartment.

The other configuration and function are the same as those of Embodiment 4, and hence their description is omitted.
(Embodiment 6)

Figure 9:
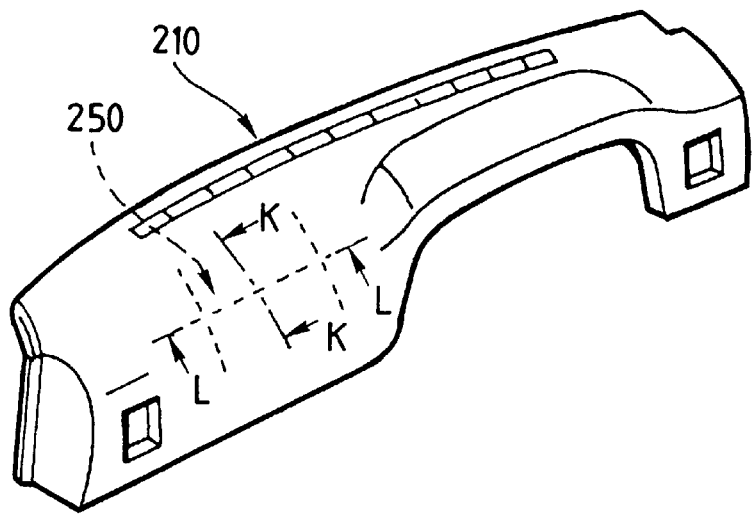
FIG. 9A is a perspective view of an instrument panel of Embodiment 6 of the invention.
FIG. 9B is a section view taken along the line K—K of FIG. 9A.
FIG. 9C is a section view taken along the line L—L of FIG. 9A.
Figure 9:
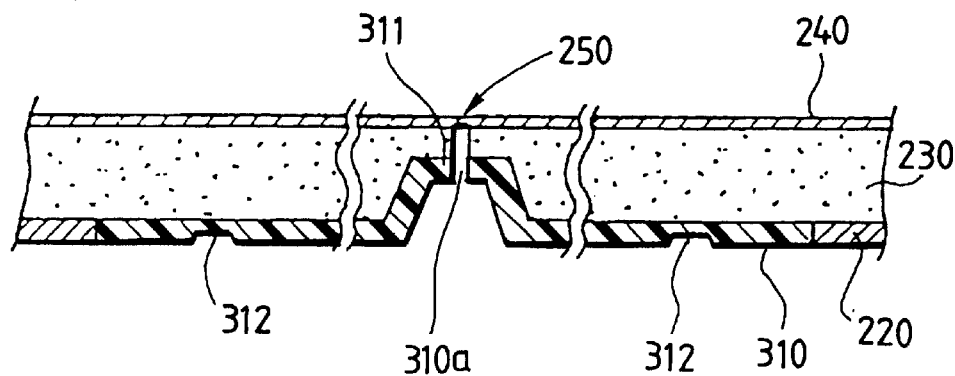
Figure 9:
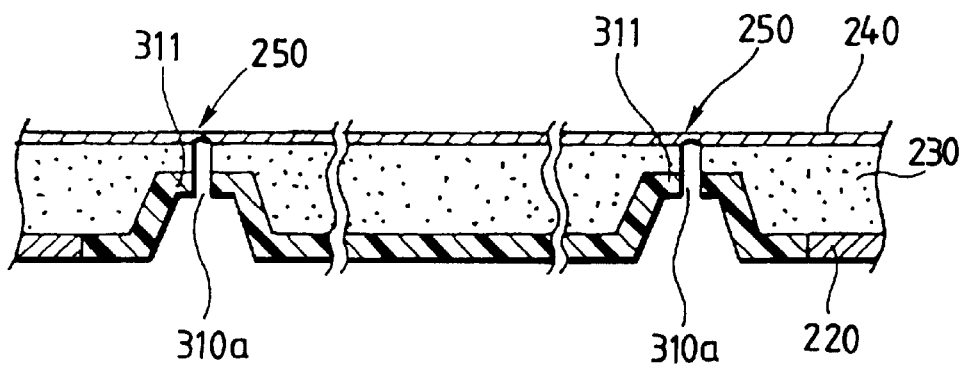
Figure 10:
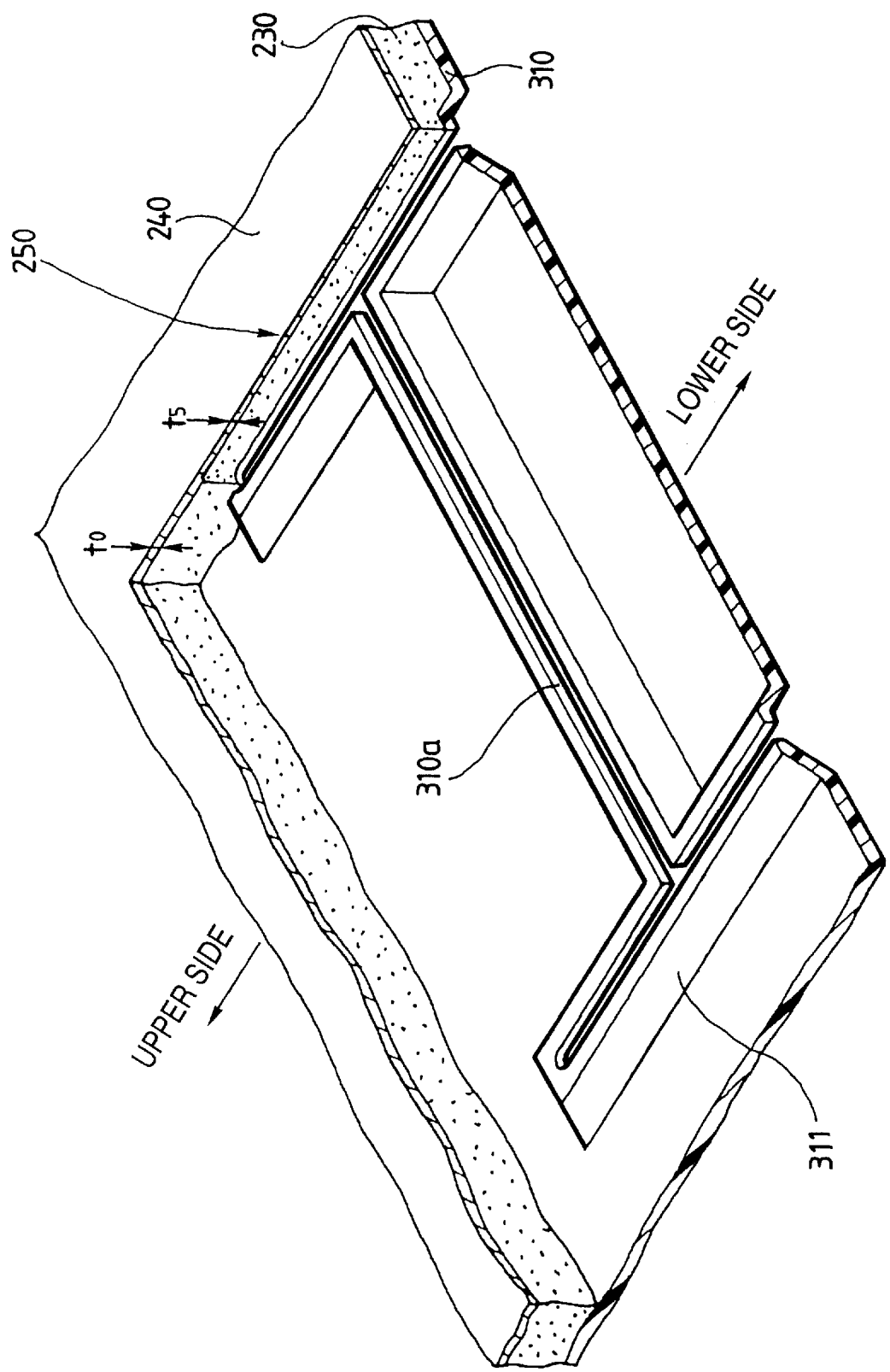
FIG. 10 is a perspective view of a tearable portion which is shown in the section views of FIGS. 9B and 9C.

FIGS. 9 and 10 show Embodiment 6 of the instrument panel, FIG. 9A is a perspective view of the instrument panel, and FIGS. 9B and 9C are section views showing a tearable portion and taken along the lines K—K and L—L of FIG. 9A, respectively.

Referring to FIG. 9A, in the instrument panel 210, a resin-made core member 220 formed by injection molding or the like, and a foamed layer 230 and a skin 240 which are formed on the surface of a lid 310 made of a thermoplastic elastomer or a metal lid 410 so as to close an opening portion 250 for inflating an air bag which portion is formed in the resin-made core member 220 are disposed so as to constitute a three-layer integration.

In the opening portion 250 indicated by broken lines, a tearable portion 260 is continuously or intermittently cut-shaped by conducting irradiation of a laser beam from the side of the core member so as not to penetrate to the skin side.

Referring to the section views of FIGS. 9B and 9C, a recess 311 directed to the surface side is formed in the resin-made core member 220, and the lid 310 made of a thermoplastic elastomer or the metal lid 410. In the recess 311, a tearable portion 310a elongating from the back face of the recess 311 to a part of the back face of the skin 240 is disposed in a continuous manner, an intermittent manner, or a combination of the two manners. Furthermore, grooves 312 are formed so as to connect the corresponding ends of the tearable portion 310a with each other, thereby forming hinges.

In Embodiment 6 disclosed above, as an example, a thermoplastic elastomer serving as a lid is bonded to the opening portion 250 for inflating an air bag which portion is formed in the resin-made core member 220, and the recess 311 and the grooves 312 serving as hinges are formed in the lid. It is a matter of course that, in place of the thermoplastic elastomer, the metal lid 410 may be used, or an integral resin-made core member in which the opening portion 250 is not formed may be used.

According to this configuration, therefore, the formation of the recess 311 causes the foamed layer 230 to be thinned, with the result that a shape which requires a reduced laser irradiation power and which can be easily worked is attained. Furthermore, the side wall of the recess 311 penetrates into the foamed layer 230 so as to form a thin shape. When the lid is to be opened by the inflation pressure of the air bag, therefore, the tearing operation is easily performed. The small thickness of the foamed layer reduces the amount of scattered pieces of the foamed layer 230 in the case of the opening operation.

As shown in FIG. 10, the recess 311 is formed as an H-like tearable portion. As an example, the tearable portion 260 which is continuously cut-shaped is formed.

In other words, a tearable portion which penetrates through the recess of the core member and the foamed layer to reach a part of the skin is formed by irradiation of a laser beam. As seen from FIG. 10, the skin remains to exist while the original thickness (t0) is reduced to a small thickness (t5).

In some cases, the tearable portion may be formed into a shape other than an H-like one. For example, the tearable portion may be formed into a U-like shape, or the whole of the tearable portion is formed in a recess which is lower in level than the other portion and the tearable portion of an H-like shape may be formed in the recess.

Figure 11:
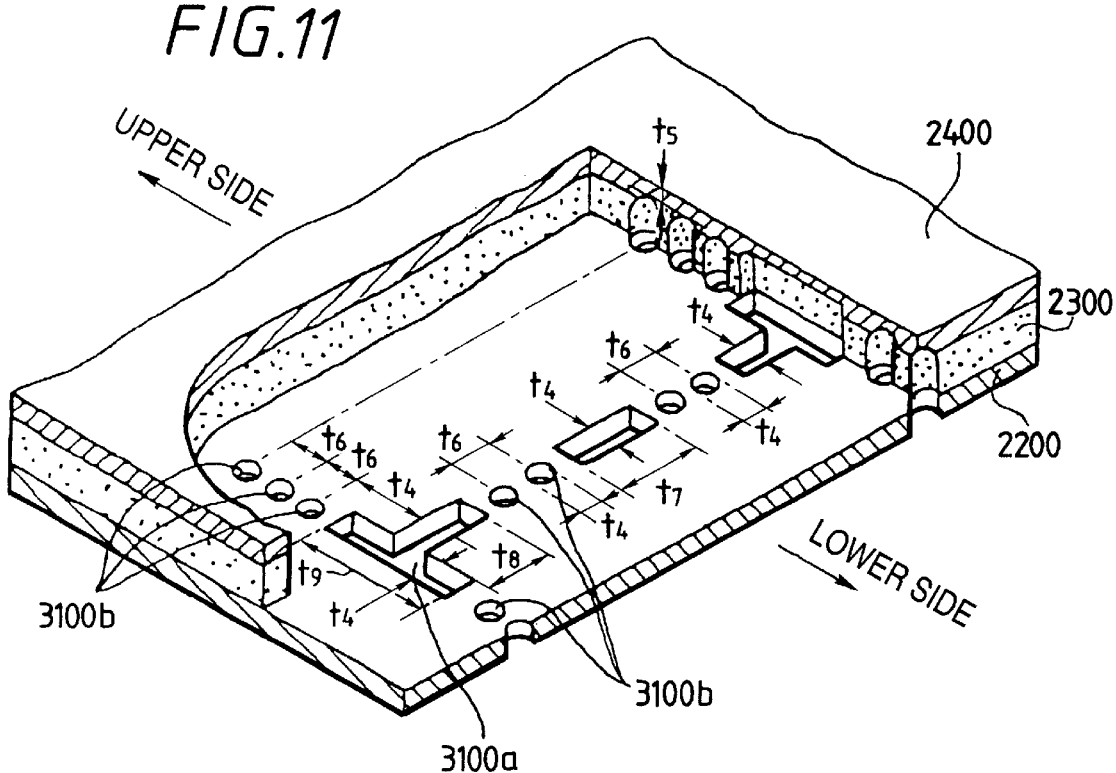
FIG. 11 shows dimensions of the tearable portion in Embodiment 6 of the invention.

FIG. 11 shows a configuration in which Embodiments 1 to 6 have a tearable portion that is continuously and intermittently formed into an H-like shape.

Referring to FIG. 11, in the tearable portion, the lateral tearable portion abuts against the middle of each of the vertical tearable portions, so as to form a T-like shape. The middle part of the lateral tearable portion, and the intersection parts of a T-like shape are formed as a continuous tearable portion 3100a, and the other part is formed as an intermittent tearable portion 3100b. These tearable portions are connected to one another to form the tearable portion 260 of an H-like shape.

The skin is made of polyvinyl chloride of a thickness of about 1 mm, the foamed layer is an urethane foamed layer of a thickness of about 7 mm, and the core member is made of a thermoplastic olefin elastomer of a thickness of about 3 mm. The cut width or the cut diameter t4 of the tearable portion 260 is set to be about 0.1 to about 1.0 mm, the residual thickness t5 of the skin is set to be about 0.3 to about 0.7 mm, the intermittence pitch t6 of the tearable portion is set to be about 0.1 to about 3.5 mm, the continuous length t7 of the middle part of the lateral tearable portion is set to be about 20 mm, the continuous length t8 of the end parts of the lateral tearable portion is set to be about 10 mm, and the continuous length t9 of the middle part of each of the vertical tearable portions is set to be about 20 mm. According to this configuration, a stable tearing operation can be obtained.

Figure 12:
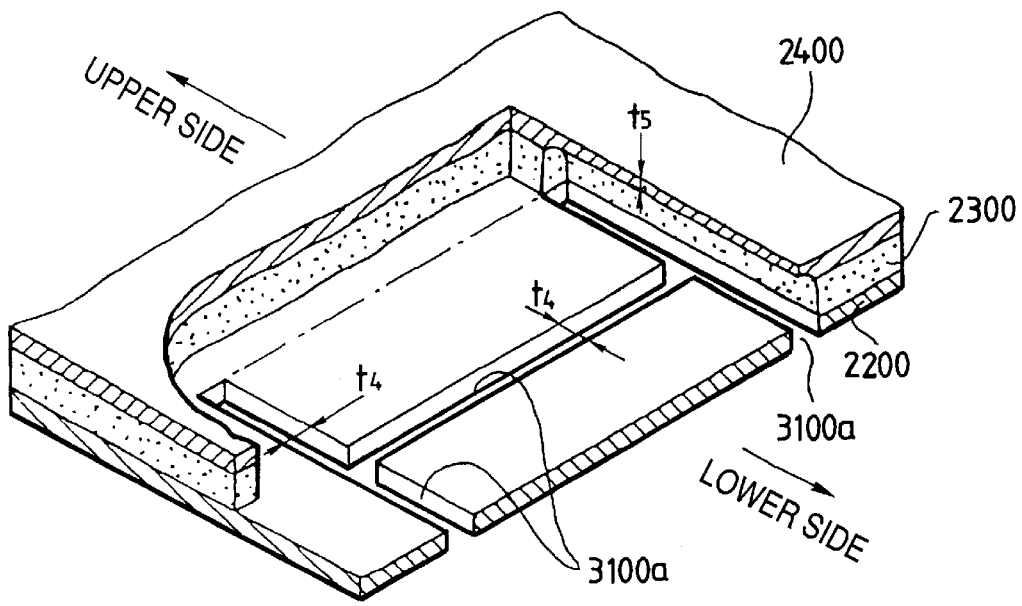
FIG. 12 shows dimensions of the tearable portion in Embodiment 6 of the invention.

FIG. 12 shows a configuration in which Embodiments 1 to 6 have a tearable portion that is continuously formed into an H-like shape.

The cut width or the cut diameter t4 of the continuous tearable portion 3100a is set to be about 0.1 to about 1.0 mm, and the residual thickness t5 of the skin is set to be about 0.3 to about 0.7 mm. According to this configuration, a stable tearing operation can be obtained.

Figure 13:
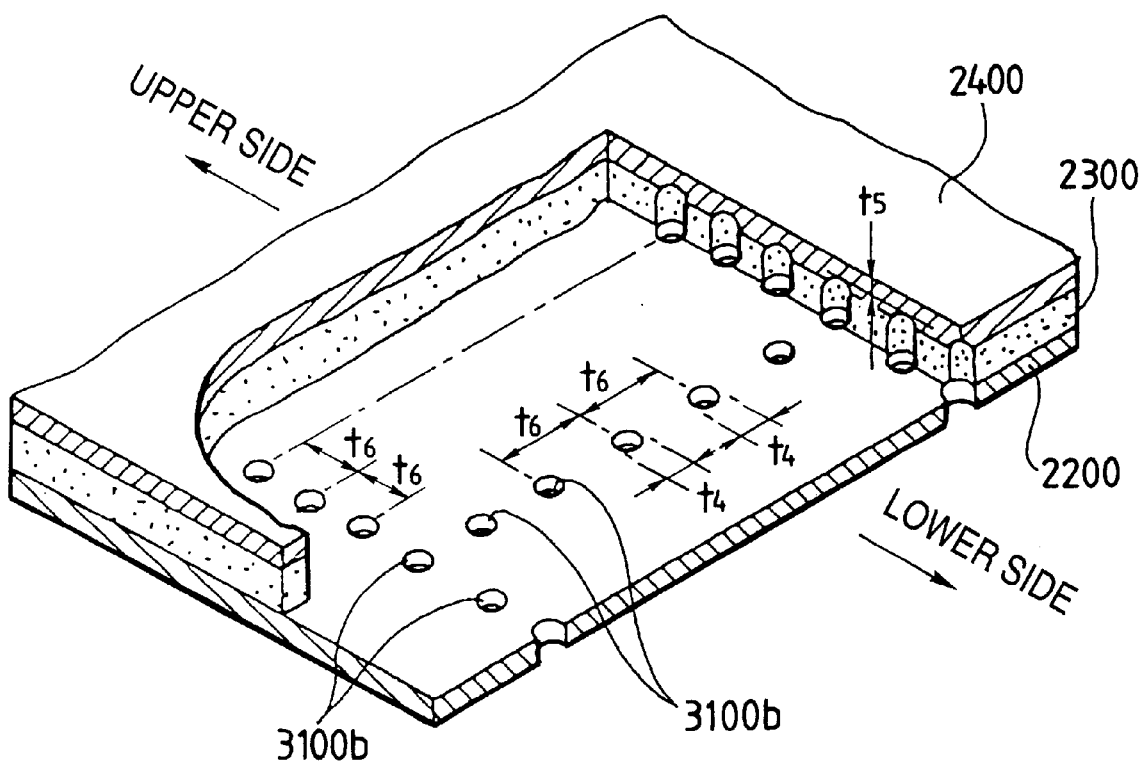
FIG. 13 shows dimensions of the tearable portion in Embodiment 6 of the invention.
Figure 14:
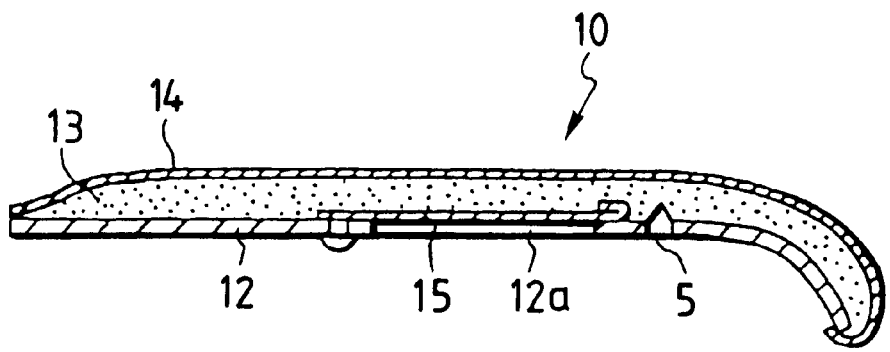
FIG. 14A is a section view of main portions of an instrument panel of the prior art.
FIG. 14B is a partial section view of the instrument panel of FIG. 14A.
FIG. 14C is a partial section view showing a molding process of the instrument panel of FIG. 14A.
Figure 14:
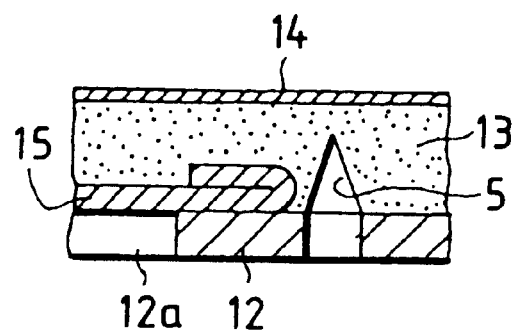
Figure 14:
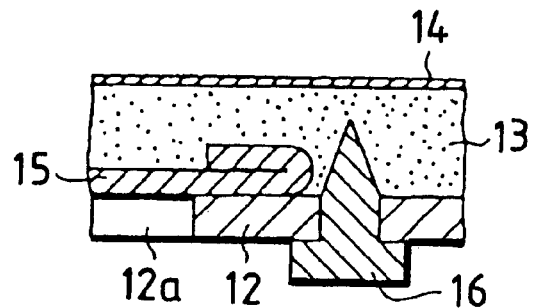

FIG. 13 shows a configuration in which Embodiments 1 to 6 have a tearable portion that is intermittently formed into an H-like shape.

The cut width or the cut diameter t4 of a continuous tearable portion 3100b is set to be about 0.1 to about 1.0 mm, and the intermittence pitch t6 of the tearable portion is set to be about 0.1 to about 3.5 mm. According to this configuration, a stable tearing operation can be obtained.

In Embodiments 1 to 6, the residual thickness t5 of the skin may be set to be 0 mm so that through holes of about 50 μm which are hardly visible can be opened. In this case, the easiness of the tearing operation can be enhanced without affecting the visual form of the skin.

As described above, in the invention, a foamed layer and a skin are laminated in this sequence on a surface of a resin-made core member which is disposed in front of a main unit of an air bag apparatus, and a tearable portion for inflating an air bag is formed by irradiation of a laser beam from a back face of the resin-made core member, the tearable portion elongating from the core member to a part of a back face side of the skin.

Therefore, a tearable portion for inflating an air bag can be economically formed only by irradiation of a laser beam and without using a molding die for forming the tearable portion. Consequently, correction of a molding die, or the like is not required and the manhours and the production steps can be reduced. As a result, the production cost can be lowered.

In an instrument panel which was molded without forming an opening portion for inflating an air bag, a tearable portion may be additionally formed, whereby the opening portion for inflating an air bag is formed. Therefore, the invention can cope with a wide variety of kinds of vehicles.

In the invention, an opening portion for inflating an air bag is formed in a resin-made core member which is disposed in front of a main unit of an air bag apparatus, a lid of a thermoplastic elastomer which closes the opening portion for inflating an air bag is formed integrally with the core member, a foamed layer and a skin are laminated in this sequence to elongate from a surface of the core member to a surface of the lid, and a tearable portion for inflating an air bag is formed by irradiation of a laser beam from a back face of the lid, the tearable portion elongating from the lid to a part of a back face side of the skin.

Therefore, it is possible to form an instrument panel which is covered by the foamed layer and the skin and hence excellent in texture, and which has a lid for inflating an air bag that cannot be seen from the outside.

Since the lid made of the thermoplastic elastomer is formed integrally with the core member, the productivity is high, and the production cost can be reduced. Furthermore, the lid made of the thermoplastic elastomer has excellent brittle resistance at low temperature. Even when the inflation pressure of an air bag is applied to the lid in a low temperature region, therefore, the lid is not damaged nor scattered.

In the invention, a lid of a thermoplastic elastomer which closes the opening portion for inflating an air bag is fixed to the core member through a bracket, a foamed layer and a skin are laminated in this sequence to elongate from a surface of the core member to a surface of the lid, and a tearable portion for inflating an air bag is formed by irradiation of a laser beam from a back face of the lid, the tearable portion elongating from the lid to a part of a back face side of the skin.

Therefore, the lid made of the thermoplastic elastomer is separately formed, and then attached to the core member through the bracket. As a result, the lid may be configured by a small-sized molded product having a necessary area, so that the productivity is high and the production cost can be reduced.

The resin-made lid may have the same physical properties as those of the lid.

In the invention, a groove is formed so that a predetermined position of the lid which is to be irradiated with a laser beam is thinned.

Therefore, the irradiation power of a laser beam for forming the tearable portion for inflating an air bag can be reduced. An apparatus of a low capacity can be used, and hence the production cost can be reduced.

In the invention, a slit having a suitable width is formed at a predetermined position of the lid which is to be irradiated with a laser beam.

Since the slit is formed, it is not required to irradiate the resin-made lid with a laser beam to work it. Accordingly, a laser apparatus of a capacity which is lower than that of the above case can be used, and hence the production cost can be further reduced. The other physical properties are the same as those of the above panel.

In the invention, a recess or a through hole is continuously or intermittently formed by irradiation of a laser beam along the gap of the bracket, and a tearable portion for inflating an air bag is formed by irradiation of a laser beam from a back face of the lid, the tearable portion elongating from the foamed layer to a part of a back face side of the skin.

Therefore, a weakened region can be formed along the gap by irradiation of a laser beam. When receiving the inflation pressure of an air bag, the lid can be deformed and opened with using the area as a hinge. In a configuration wherein a metal bracket face is used as a hinge in this way, a high working accuracy can be easily realized, and a hinge function is stably exhibited. The other physical properties of the tearing operation are the same as those of the panel.

In the invention, both end portions of the bracket are formed integrally with the core member and the lid so as to be coupled therewith, respectively.

Therefore, the core member and the lid can be simultaneously molded, and are not required to be assembled together, so that the productivity is high, and the production cost can be reduced. Since both the end portions are fixed in the whole face, the inflation pressure of an air bag can be received by the whole peripheral edge so as to be distributed. As a result, the opening operation is stabilized. The other physical properties of the tearing operation are the same as those of the panel.

In the invention, a continuous slit is formed in the metal lid, and a tearable portion for inflating an air bag is formed by irradiation of a laser beam from a back face of the metal lid and along the slit, the tearable portion elongating from the foamed layer to a part of a back face side of the skin.

Although the lid is made of a metal which requires a high power of laser irradiation, therefore, the formation of the lit enables the irradiation of a laser beam to be performed only over the foamed layer and the skin in the formation of the tearable portion. Accordingly, a laser apparatus of the lowest capacity can be used, and hence an apparatus of a small power which is economical can be used. Furthermore, the working rate can be improved and the production cost can be reduced.

In the invention, the tearable portion for inflating an air bag which portion is cut by the irradiation of a laser beam is continuously or intermittently formed.

In the prior art, a tearable portion is finished into an appropriate shape by correcting the shape into a continuous or intermittent one by using a molding die, in accordance with a judgment on the condition of the inflation of an air bag which depends on the shape of the air bag, the type of an inflator, the design shape of the instrument panel, etc. Unlike the prior art, the tearable portion can be formed only by irradiation of a laser beam. Therefore, an appropriate tearable portion of a stable quality can be formed in a short period of time.

In the invention, the tearable portion for inflating an air bag which portion is continuously or intermittently cut-shaped has a cut width or a cut diameter of about 0.1 to about 1.0 mm, and an intermittence pitch of about 0.1 to about 3.5 mm.

Among the dimensions of the tearable portion which are obtained from examples of inflation of an air bag, the cut width or the a cut diameter, and the intermittence pitch are appropriate. When the tearable portion is formed so as to have such dimensions, an air bag can be stably inflated in a predetermined state.

In the invention, a recess which is directed toward a skin is formed in a resin-made core member, a thermoplastic elastomer-made lid, or a metal lid, and a tearable portion for inflating an air bag is formed by irradiation of a laser beam to the recess from a back face of the resin-made core member, the thermoplastic elastomer-made lid, or the metal lid, the tearable portion being cut so as to elongate from the resin-made core member, the thermoplastic elastomer-made lid, or the metal lid to a part of a back face side of the skin.

Therefore, the recess is formed in a flat face of the core member, so that the flat face is reduced in size. Accordingly, the strength of the core member is enhanced. The thickness of the foamed layer is reduced by the formation of the recess in the core member. Consequently, the laser irradiation power can be reduced so that a laser apparatus of a small capacity can be used and the production cost can be reduced. Since the foamed layer is thinned by the formation of the recess in the core member, the foamed layer is less scattered when the lid is opened as a result of the inflation of an air bag.

In the invention, the tearable portion for inflating an air bag which portion is formed into an H-like shape and is continuously or intermittently formed. In the tearable portion formed into an H-like shape, furthermore, a middle part of a lateral tearable portion and intersection parts of the lateral tearable portion and vertical tearable portions are continuously formed, and another part is intermittently formed.

Therefore, the tearable portion for inflating an air bag is torn in an H-like shape and an opening operation can be surely conducted in vertical or two directions.

When the inflation pressure of the air bag acts on the lid, the middle part of the lateral tearable portion is first pressed. Since the middle part is continuously formed, a tearing operation advances in the lateral tearable portion while the middle part functions as a starting part. The direction of the tearing operation which has advanced in the lateral tearable portion is changed to vertical directions so that the tearing operation advances in upward and downward directions, because also the intersection part of the lateral and the vertical tearable portion is continuously formed. Consequently, the lid can be surely opened in upward and downward directions.

In the invention, the middle part of the lateral tearable portion of the tearable portion for inflating an air bag has a continuous length of about 20 mm, a part of the lateral tearable portion elongating to the vertical tearable portions has a continuous length of about 10 mm, the vertical tearable portions have a continuous length of about 20 mm, an intermittence width or a cut diameter of the tearable portion is about 0.1 to about 1.0 mm, and an intermittence pitch of the tearable portion is about 0.1 to about 3.5 mm.

Among the dimensions of the tearable portion which are obtained from examples of inflation of an air bag, the section length of the lateral tearable portion elongating to the vertical tearable portions, the intermittence length and the intermittence width of the vertical tearable portions, the cut diameter, and the intermittence pitch are appropriate. When the tearable portion is formed so as to have such dimensions, an air bag can be stably inflated in a predetermined state.

In the invention, a surface side of the skin of the tearable portion for inflating an air bag remains to exist in a range of about 0.3 to about 0.7 mm.

Among the dimensions of the tearable portion which are obtained from examples of inflation of an air bag, the remaining dimension of the surface side of the skin is appropriate. When the tearable portion is formed so as to have this dimension, also the tearing operation of the skin can be surely conducted. Therefore, a phenomenon in which the skin is torn to the outside of the lid portion and the inflation direction of the air bag become unstable is prevented from occurring.

In the invention, the surface of a cell of the foamed layer is covered with the film. When a tearing operation is conducted as a result of the inflation of an air bag, therefore, the breakage hardly propagates to the foamed layer. Consequently, the instrument panel is prevented from being crushed and scattered.

What is claimed is:

1. An instrument panel, comprising:
   a core member made of resin, in which an opening portion is defined;
   an airbag apparatus including an airbag, said airbag apparatus disposed in front of said opening portion for inflating said airbag;
   a lid having a front surface and a back surface made of a thermoplastic elastomer;
   a metal bracket having a flange, said bracket being through which said lid is fixed to said core member so that said lid closes said opening portion, wherein said lid extends over and below said flange to close said opening portion;
   a foamed layer laminated on said core member and the front surface of said lid; and
   a skin laminated on said foamed layer,
   wherein a tearable portion of said lid is formed by irradiation of a laser beam from the back surface of said lid, said tearable portion elongates from said lid to a part of said skin, and said tearable portion tears on inflation of said airbag.

2. The instrument panel according to claim 1, wherein a groove is formed to thin a predetermined position of said lid to be irradiated with a laser beam.

3. The instrument panel according to claim 1, wherein a slit having a suitable width is formed at a predetermined position of said tearable portion of said lid to be irradiated with a laser beam.

4. The instrument panel according to claim 1, wherein said lid has a recess directed toward said skin, to which the laser beam is to be irradiated to form the tearable portion.

5. The instrument panel according to claim 1, wherein said foamed layer is made of a thermoplastic resin material; and
   wherein said foamed layer is melted by the irradiation of the laser beam to form a film on a cut surface of each of the plurality of holes.

6. The instrument panel according to claim 1, further comprising engaging means fixing said bracket to said core member.

7. The instrument panel according to claim 1, wherein said tearable portion includes a plurality of holes formed continuously or intermittently.

8. The instrument panel according to claim 7, wherein each of the plurality of holes has a diameter or a width of about 0.1 to 1.0 mm.

9. The instrument panel according to claim 8, wherein the plurality of holes are formed by the irradiation of the laser beam so that said skin has a thickness of substantially 0.3 to 0.7 mm.

10. The instrument panel according to claim 7, wherein a distance between the adjacent holes is substantially 0.1 to 3.5 mm.

11. The instrument panel according to claim 7, wherein said tearable portion is arranged in a form of an H-shape.

12. The instrument panel according to claim 7, wherein a T-shaped hole is formed at each of two parts corresponding to two nodes at which two vertical lines and a lateral line of the H-shape are met;

wherein a continuous hole is formed at a part corresponding to a center position of the lateral line of the H-shape; and wherein the remaining parts are intermittently formed by a plurality of holes.

13. The instrument panel according to claim 12, wherein the continuous hole is substantially 10 mm in length;

wherein each of the two T-shaped holes has a length of substantially 10 mm in a direction of the lateral line of the H-shape; and wherein each of the two T-shaped holes has a length of substantially 20 mm in a direction of the vertical line of the H-shape.

14. The instrument panel according to claim 13, wherein the continuous hole and the two T-shaped holes are 0.1 to 1.0 in width.

15. The instrument panel according to claim 13, wherein a distance between the adjacent holes in the plurality holes of the remaining parts is substantially 0.1 to 3.5 mm.

16. An instrument panel, comprising:

a core member made of resin, in which an opening portion is defined;

an airbag apparatus including an airbag, said airbag apparatus disposed in front of said opening portion for inflating said airbag;

a lid having a front surface and a back surface made of a thermoplastic elastomer;

a bracket made of a metal, said bracket through which said lid is fixed to said core member so that said lid closes said opening portion;

a foamed layer laminated on said core member and the front surface of said lid; and a skin laminated on said foamed layer, wherein a tearable portion of said lid is formed by irradiation of a laser beam from the back surface of said lid, said tearable portion elongates from said lid to a part of said skin, and said tearable portion tears on inflation of said airbag;

wherein a gap of a predetermined size is formed between said lid and an opening edge of said opening portion; and wherein said bracket includes a plurality of recesses or pass-through holes continuous or intermittently formed by irradiation of the laser beam in the gap.

* * * * *